May 26, 1959

J. J. KAMP ET AL 2,887,878

AMPLIFIER FOR AN INDUCTION FLOW METER

Filed April 27, 1953

INVENTORS:
JOHANNES JACOBUS KAMP
JACOBUS LAURENS SMALS
BY

Curtis, Morris & Safford.
ATTORNEYS:

May 26, 1959  J. J. KAMP ET AL  2,887,878
AMPLIFIER FOR AN INDUCTION FLOW METER
Filed April 27, 1953  2 Sheets-Sheet 2

INVENTORS:
JOHANNES JACOBUS KAMP
BY JACOBUS LAURENS SMALS

Curtis, Morris & Safford.
ATTORNEYS:

2,887,878
Patented May 26, 1959

2,887,878

AMPLIFIER FOR AN INDUCTION FLOW METER

Johannes Jacobus Kamp and Jacobus Laurens Smals, Amsterdam, Netherlands, assignors, by mesne assignments, to Foxboro Company, Foxboro, Mass., a corporation of Massachusetts Application April 27, 1953, Serial No. 351,278

Claims priority, application Netherlands May 2, 1952

3 Claims. (Cl. 73—194)

The invention relates to an amplifying device for measuring the signal voltage of an induction flow meter which is equipped with an alternating current magnet, and especially to the controlling part of said amplifier, which compensates for signal variations due to the field variations of the magnet.

It will be known by those skilled in the art, that the induction flow meter employs Faraday's Law of Induction for measuring fluid flows. In its principal form it consists of a magnetic field, a liquid flow conduit perpendicular to the magnetic field and two electrodes in the wall of the conduit, placed in line at right angles to the magnetic field and the conduit. When liquid is passing through the conduit, a potential is set up between the electrodes. This voltage is proportional to the rate of liquid flow and to the magnetic field strength. A constant or an alternating magnetic field can be used. The advantages and the disadvantages are fully described by several authors and need not be discussed here. For details of a specific induction flowmeter construction of the general type contemplated herein, reference is made to our co-pending application Serial No. 299,518, filed on July 17, 1952, now Patent No. 2,771,771; this flowmeter, as is conventional, includes magnet coils for producing flux across a moving stream of fluid.

Our invention relates to the types of induction flow meters that are equipped with an alternating current magnet. With these flow meters the signal voltage is dependent on the voltage source of the magnet. If the voltage or the frequency of the magnet power supply change, the magnetic field also changes and the signal voltage will be influenced to the same degree.

The accuracy of these types of induction flow meters is limited by the accuracy of the voltage and the frequency of the voltage sources of the magnet. A third source of magnet inaccuracy is the temperature coefficient of the resistive part of the magnetic impedance. If the magnet has an impedance which is great in respect to its resistance, the influence of the temperature coefficient of the resistance on the magnetic field can be made sufficiently small. In this case, however, the influence of the frequency on the magnetic field is greatest. The magnetic field in this case is inversely proportional to the frequency and proportional to the applied voltage. To overcome this difficulty a stabilized voltage source is commonly used for the magnet and also for the amplifier.

In cases where the magnet frequency is not the line frequency, the magnet is fed from an oscillator or another local frequency source. The frequency and the voltage of such a local frequency source have to be controlled to an accuracy equal to or better than one-half the wanted flow measurement accuracy. For, if both frequency and voltage have an error of 1%, the flow signal can be right if the two errors balance and can be off by as much as 2% if the two errors coincide.

If the magnet is fed from the line voltage or from a line voltage stabilizer, the frequency cannot be controlled.

In accordance with our invention, simple and accurate means are provided for compensating the influence of frequency- and voltage-changes on the flow signal, within the normally encountered frequency and voltage variations. It overcomes the need for bulky and expensive stabilizers for magnet and amplifier and results in a relatively simple, reliable and accurate amplifier, which can be used for industrial applications.

The invention consists of a special negative feedback control-unit for the amplifier, which produces an amplifier gain that is proportional to the frequency and inversely proportional to the voltage of the signal applied to the magnet.

The amplifier fed by the signal source 24 can be of usual design, but the feedback loop is different. The feedback-circuit is controlled by the power supply 2 of the magnet in such a way that the amount of feedback increases if the power supply voltage (and thus the magnet voltage) increases, resulting in a decreased amplifier gain. Moreover the negative feedback control-unit 3 has an impedance combination, which with increasing frequency of the magnet power supply 2 decreases the amount of feedback, resulting in an increased amplifier gain. With proper setting of the feedback control-unit, ±10% changes of power supply voltage and frequency are substantially compensated for, resulting in a measuring accuracy of better than 1%.

Figure 2:
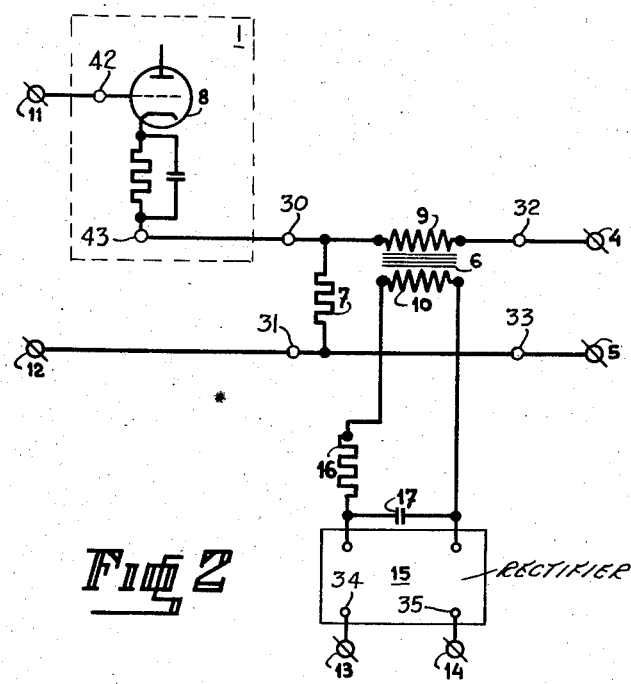
Fig. 2 shows a simplified circuit form of the feedback control.

The negative feedback control-unit 3 will now be described in detail. Fig. 2 gives details of the invention in its simplest form. From the output of the amplifier, indicated by the terminals 4, 5 a signal is derived that is fed through the control unit terminals 32, 33 to an inductor 9 and a resistor 7. This resistor may be for instance a part of the cathode-circuit of the first tube 8 of the amplifier. That is, the resistor 7 is bridged across the control unit terminals 30, 31 with terminal 30 being connected directly to one amplifier input terminal 43 in the cathode-biasing circuit of the first amplifier tube 8. The other control unit terminal 31 is connected to one of the flowmeter output terminals 12, the other output terminal 11 being connected to the amplifier input terminal 42. The impedance of the inductor 9, which is wound on a core 6, advantageously is high with respect to the resistance of resistor 7. In this case the voltage across the resistor 7 is essentially determined by the magnitude of the impedance of the inductor 9.

Assume, for example that the frequency of the amplifier signal increases. Since the impedance of the inductor 9 is proportional to frequency, the current passing therethrough (and thus the voltage drop across resistor 7) will vary inversely proportional to the frequency and will decrease, thus decreasing the amount of negative feedback and increasing the gain of the amplifier 1. As the field of the magnet (and thus the flow signal) will decrease with increasing frequency, the increasing gain of the amplifier 1 will compensate for the signal decrease, resulting in the same output signal regardless of frequency variations. The degree of the compensation can be controlled by varying the amount of feedback, and by varying the impedance ratio between the inductor 9 and resistor 7. The desired compensation is derived from the frequency features of the magnet.

Figure 1:
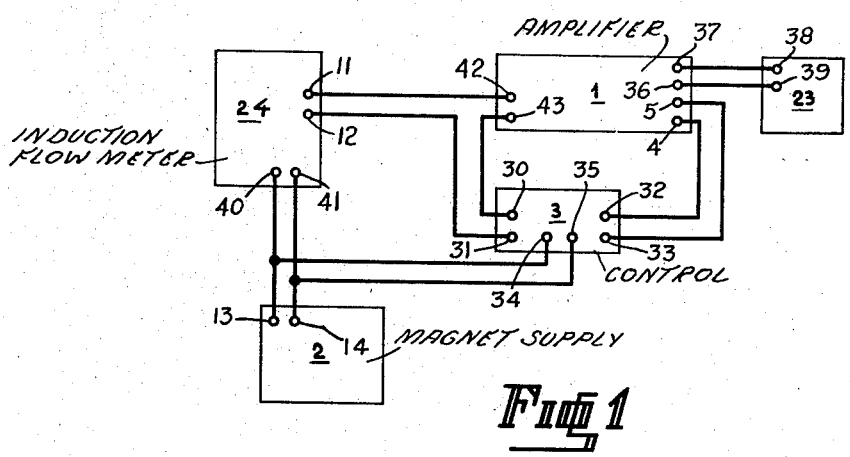
Fig. 1 illustrates diagrammatically the manner in which the invention can be accomplished.

The core 6 carries a second winding: the control winding 10, through which passes a direct current which is derived from the magnet power supply 2 (shown in Figure 1) via terminals 13, 14. For this purpose, the terminals 13, 14 are connected to the input circuit (terminals 34, 35) of a rectifier 15, which may be of the usual design including suitable filtering arrangements, the output circuit of which is connected through a resistance-capacitance network (16, 17) to the control winding 10.

The resistor 16 decreases the temperature-coefficient of the circuit 16, 10 to a negligible amount and also prevents the short circuiting of the inductive winding 9 by the filter capacitor 17. The magnetic field caused by the direct current in the core 6 is high with respect to the magnetic field caused by the negative feedback signal. The relatively small field of the negative feedback signal is superimposed on the field produced by the direct current, so the working point on the magnetic hysteresis loop (and thus the inductance of the winding 9) is determined by the direct current through the control winding 10.

As this direct current is proportional to the magnet power supply voltage, the inductance of winding 9 is also controlled by the magnet voltage. With increasing voltage, the direct current increases, and the core 6 becomes more nearly saturated. Consequently, the impedance of the inductance 9 decreases, which gives a higher voltage across the resistor 7 and thus more negative feedback, resulting in a decreasing amplifier gain. The influence of the direct current on the impedance of the inductor 9 is determined by the type of core material, the airgap and the working point on the hysteresis loop. The latter is controlled by the resistor 16. The amount of compensation of the magnet voltage variations can also be controlled by the amount of feedback of the amplifier.

Figure 3:
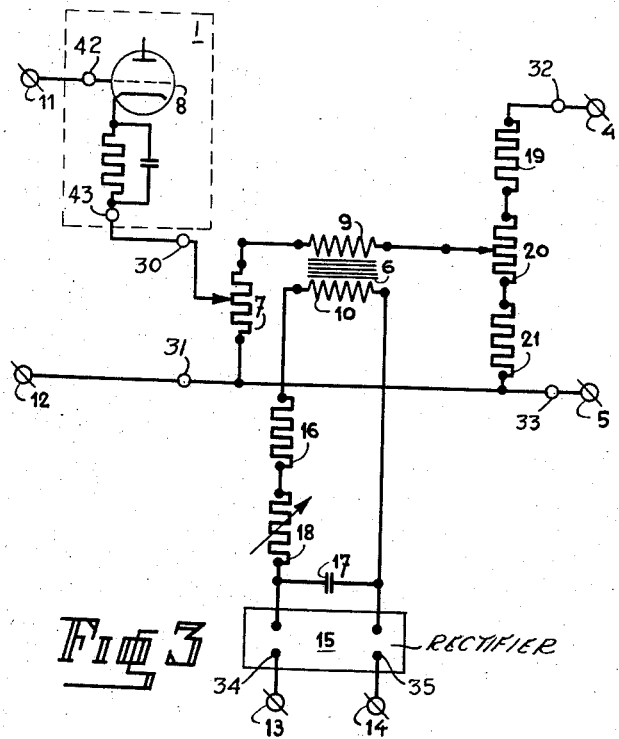
Fig. 3 shows a detailed circuit arrangement of the feedback control.

Fig. 3 gives a more detailed circuit arrangement according to the invention. The negative feedback signal from the amplifier terminals 4, 5 is attenuated to the proper degree by the potentiometers 19, 20 and 21. By varying the setting of potentiometer 20 the amplifier gain can be controlled, for instance for recalibrating purposes. By varying the resistor 7, and resistor 18 in series with resistor 16, the proper compensation for frequency and voltage changes can be obtained.

Figure 4:
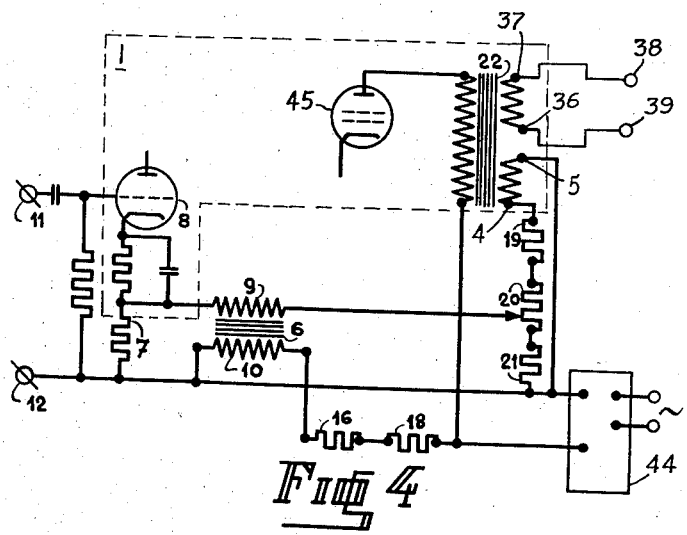
Fig. 4 shows an alternative arrangement of the components.

Fig. 4 relates to the case where the magnet and the amplifier are both fed from the line voltage. Now the direct current for the control winding 10 can be derived directly from the amplifier power supply 44.

While preferred embodiments of the invention have been described, it will be understood that further modifications may be made without departing from the spirit and the scope of the invention as set forth in the appended claims.

We claim:

1. An apparatus adapted to amplify the output signal produced by an A.-C. induction flow meter and to automatically compensate for variations in said output signal arising from changes in the frequency or magnitude of the magnet supply voltage for said flowmeter, comprising, in combination, an induction flowmeter of the type having magnet means for producing flux across a stream of fluid, a source of alternating magnet supply voltage for said flowmeter, an alternating-current amplifier adapted to be coupled to and intensify the signal produced by said flowmeter, a negative feedback circuit for feeding to the input of said amplifier a negative feedback signal corresponding in magnitude to the output of said amplifier, a network including an inductor in series with a resistor and connected in said feedback circuit for controlling the amount of feedback in accordance with the frequency of the voltage produced by said source, and a control winding on said inductor for varying the impedance of said inductor in accordance with the magnitude of current passing through said winding, said control winding being energized by said magnet supply voltage whereby variations in said amplifier input signal due to changes in the magnitude or frequency of said magnet power supply are substantially compensated for by corresponding variations in the gain of said amplifier.

2. Apparatus adapted to amplify the output signal produced by an A.-C. induction flow meter and to automatically compensate for variations in said output signal arising from changes in the frequency or magnitude of the magnet supply voltage for said flowmeter, comprising, in combination, an induction flowmeter of the type having magnet means for producing flux across a stream of fluid, a source of alternating magnet supply voltage for said flowmeter, an alternating-current amplifier adapted to intensify the signals produced by said flowmeter, a negative feedback circuit for feeding to the input of said amplifier a negative feedback signal corresponding in magnitude to the output of said amplifier, an inductor wound on a magnetic core and connected in series with said feedback circuit, a control winding wound on said core for varying the impedance of said inductor by altering the flux-saturation of said core, and rectifier means connected to said source of supply voltage and having an output circuit coupled to said control winding for producing direct current therein proportional in magnitude to the voltage of said source of supply voltage, whereby variations in the amplifier input signal caused by changes in the magnitude or frequency of said supply voltage are compensated for by corresponding variations in the gain of said amplifier.

3. Flow measuring apparatus comprising, in combination, an induction flowmeter of the type having at least one magnet coil for producing flux within a stream of fluid in which a pair of fluid-contacting electrodes are positioned for developing an A.-C. intelligence signal in accordance with the rate of fluid flow, A.-C. supply means for energizing said magnet coil with alternating current having a frequency within a predetermined range of frequencies, an A.-C. amplifier having input and output circuits, said input circuit being coupled to the electrodes of said flowmeter, a negative feedback circuit for feeding to said input circuit an A.-C. rebalancing signal corresponding to the output of said amplifier, said A.-C. rebalancing signal being coupled in series-opposition to the A.-C. intelligence signal, and amplitude control means in series with said negative feedback circuit; said amplitude control means comprising an attenuation circuit having a reactive element and additional means operable together, within said predetermined range of frequencies, to increase the attenuation in said feedback circuit in response to an increase in frequency of the feedback signal; said attenuation circuit being constructed and arranged to increase the attenuation in exact proportion to the decrease in amplitude of the intelligence signal produced by said induction flowmeter as a result of said increase in frequency, whereby changes in amplitude of said intelligence signal due to frequency variations have no effect on the output of said amplifier.

References Cited in the file of this patent

UNITED STATES PATENTS

| | | |
|---|---|---|
| 1,725,161 | Rutter | Aug. 20, 1929 |
| 1,862,595 | Holden | June 14, 1932 |
| 2,068,116 | Shotter | Jan. 19, 1937 |
| 2,269,408 | Kinsburg | Jan. 6, 1942 |
| 2,290,084 | Albright | July 14, 1942 |
| 2,549,782 | Engelman | Apr. 24, 1951 |
| 2,757,538 | Soffel | Aug. 7, 1956 |